Feb. 6, 1951          I. ANDREWS          2,540,230

ANTISKID DEVICE FOR MOTOR VEHICLE TIRES

Filed Sept. 22, 1948          3 Sheets-Sheet 1

Inventor

By Irving Andrews

Wooster & Davis Attorneys.

Inventor
By Irving Andrews
Wooster & Davis Attorneys.

Feb. 6, 1951 — I. ANDREWS — 2,540,230
ANTISKID DEVICE FOR MOTOR VEHICLE TIRES
Filed Sept. 22, 1948 — 3 Sheets-Sheet 3

Inventor
Irving Andrews
By Wooster & Davis, Attorneys

Patented Feb. 6, 1951

2,540,230

UNITED STATES PATENT OFFICE 2,540,230

ANTISKID DEVICE FOR MOTOR VEHICLE TIRES

Irving Andrews, Bethel, Conn., assignor of one-third to Vernon B. Guion and one-third to George P. Letts, both of Bethel, Conn.

Application September 22, 1948, Serial No. 50,489

10 Claims. (Cl. 152—218)

1

This invention relates to antiskid devices for motor vehicle tires, and has for an object to provide an improved construction for this type of device which will eliminate the usual chain construction and will provide a substantially continuous antiskid tread around the tire.

It is also an object to provide a construction employing substantially flat rubber strips extending at an angle across the tread of the tire to give a more effective antiskid tread.

Another object is to provide a device in which there is always traction on the pavement with no dead spots between the cross members, and they are so arranged as to practically eliminate vibration and a bumping effect on the road.

A still further object is to provide a construction to facilitate applying the device to and removing it from the tire so that it is easy to put on and take off, and these operations may be performed quickly.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

Figure 2:
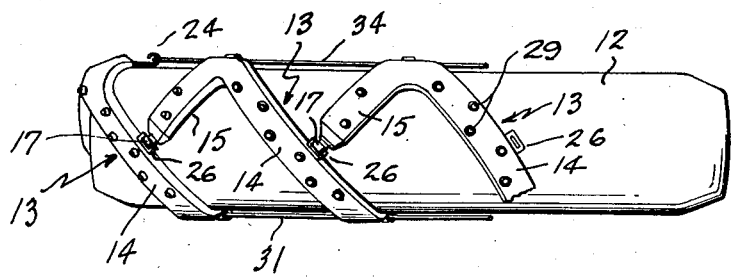
Fig. 2 is a top plan view thereof.
Figure 5:
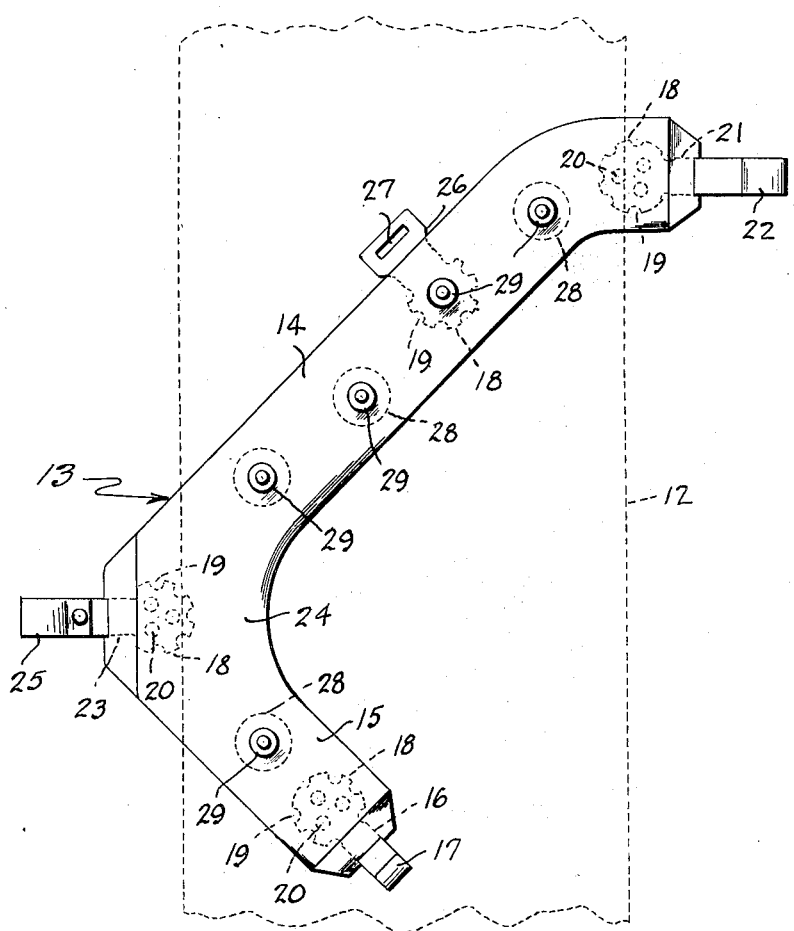
Fig. 5 is an enlarged view of one of the antiskid elements.
Figure 6:
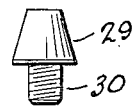
Fig. 6 is a side view of one of the calks removed.

In the drawing, any suitable type of automobile wheel such, for example, as a disc wheel, is shown at 10 with a hub cap 11 and the tire 12. This improved antiskid device comprises a connected series of substantially L-shaped members 13, each comprising substantially flat cross elements or legs 14 and 15 of vulcanized rubber, and they may or may not be reinforced with fabric or the like molded and vulcanized in this rubber. They are preferably of rectangular cross section so that the outer edges give a good grip on the pavement, and they also lie flat on the surface of the tread of the tire. Being of vulcanized live rubber they are flexible so as to conform to and fit snugly across the tire tread. They are arranged as indicated in Figs. 2 and also Fig. 5 so that the long leg 14 extends diagonally across the tread of the tire, and the short leg 15 is also diagonally to the tire at substantially right angles to the long leg 14 and extends approximately half way across the tread. It is preferred that the angle between the legs be about 90°, but it is not limited to this angle and may be varied as found desirable.

Molded in the free end of the short leg 15 is an insert plate 16 provided with a hook 17 projecting from the free end. The plate is provided with an enlarged head portion 18 molded within the rubber of the leg, and it may be provided with means for locking with the molded and vulcanized rubber, such for example, as recesses 19 in its outer edge and openings 20 through the plate into which the rubber will flow in the molding operation, and vulcanized to securely lock or anchor this holding device in the rubber. A similar element 21 is molded and anchored in the free end of the long leg 14 and projects from this free end and is provided with a loop 22. A similar element 23 is molded and anchored in the connecting angle or corner 24 of this member and projects from it in the opposite direction from the elements 16 and 21 and is provided with a loop or hook 25. Still another connecting member 26 comprising a similar plate is molded and anchored in the long leg 14 located so as to be about the center of the tire tread and projecting from the edge of this long leg opposite to the hook 17 and substantially aligned with it. This insert plate is provided with an elongated slot 27 to receive the hook 17 of the next adjacent L-shaped member, so that, as will be seen from Figs. 1 and 2, a continuous tread may be provided entirely around the periphery of the tread of the tire, and the adjacent L-shaped members are connected and locked together by the hooks 17 and the plates 26 with the free end carrying the element 21 and adjoining corner or angle carrying the insert 23 located on the opposite sides of the tire.

To increase the traction or grip of these members they may be provided with a series of inserts 28 molded and anchored in the cross legs 14 and 15 and tapped to receive the removable calks 29. These elements can be washers or plates provided with a tapped opening to receive the threaded shank 30 of the calks. The exposed or head portion of the calk may be of any desired form or shape, but is preferably substantially frustoconical as shown. If desired the anchored plates of the inserts 16 and 26 may be provided with tapped openings to receive similar calks, as shown for the insert 26 in Fig. 5.

The L-shaped members 13 are preferably so proportioned and shaped that when in position on the tread of the tire the free end of the short leg 15 is about on the center line of the tread, and the free end of the long leg 14 is substantially opposite the angle 24 between the legs of the next adjacent member so as to provide a continuous bearing of the tread on the road surface to eliminate vibration or pounding on the pavement. Also, with this arrangement there is always traction upon the pavement with no dead spots between the cross members. It is preferred that the back surfaces or the surfaces of these members next to the tire tread be roughened, corrugated or checked (for example, similar to the tread on the sole of a boot) so as to increase the grip on the tire and reduce liability of its sliding on the tread.

Figure 4:
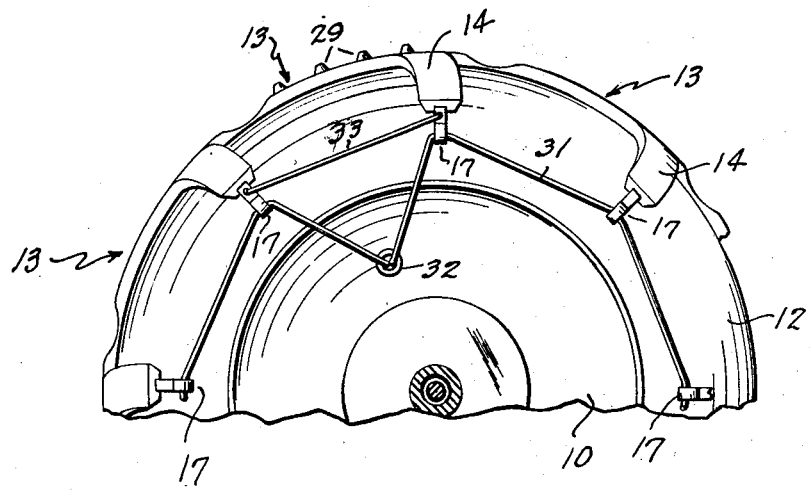
Fig. 4 is a view of a portion of the wheel from the rear or inner side and showing this device applied.
Figure 3:
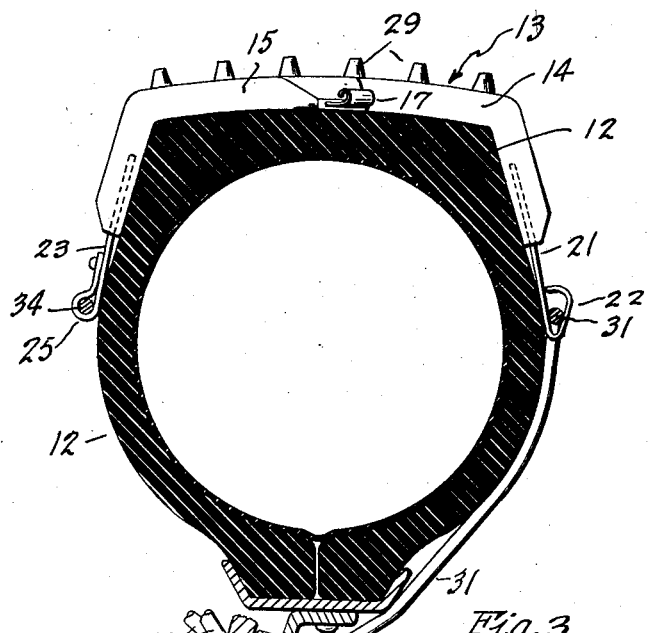
Fig. 3 is a transverse section on a larger scale.

The connected members are secured on the tread by means of a flexible wire or cable 31 passing through the hooks 22, as shown in Fig. 4, and with the free end portions passing through a sleeve 32 mounted in an opening in the wheel disc. If desired, the hooks 22 may be tapered, as shown in Fig. 3, so that as this wire or cable is drawn taut it will be drawn into the taper and gripped, or if it is preferred to permit free sliding movement of the cable these grooves can be circular. At the points adjacent or opposite where the free ends pass through the sleeve 32, the two adjacent loops are connected by a short wire or cable 33 to maintain the proper spacing at this point.

Figure 1:
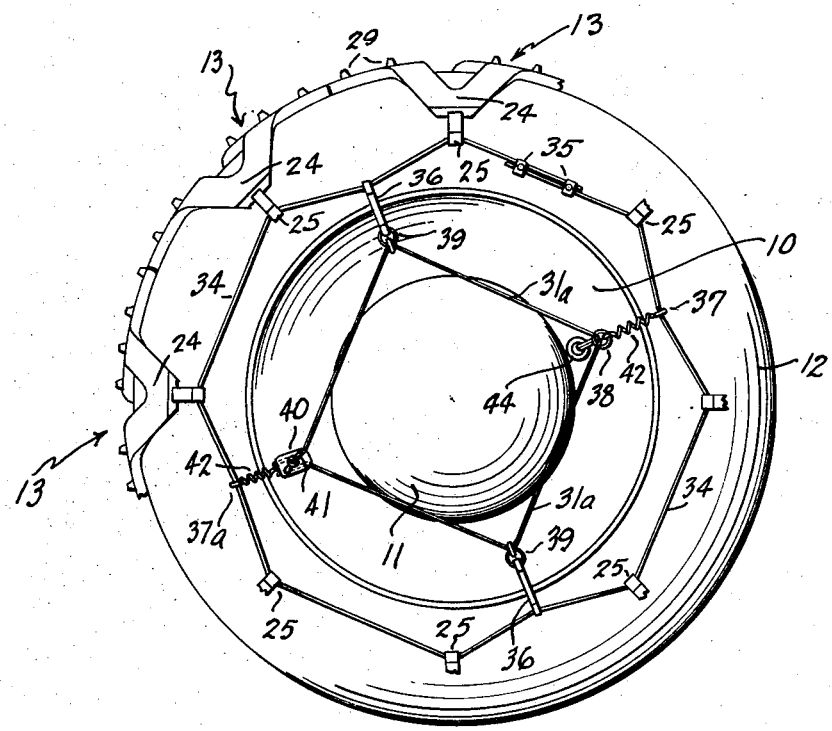
Fig. 1 is a front elevation or outside view of a wheel with a tire on it and showing this device applied thereto, portions of the tread elements being omitted to simplify the drawing.

On the outside of the tire the L-shaped members are connected by a flexible wire or cable 34 passing through the loops 25 on the inserts 23 at the angle between the tread members, and their free ends may be connected by any suitable means, such, for example, as the clamps 35. At any desired points in the wire or cable 34 are suitable connecting straps 36 and 37, four generally being sufficient. As shown in Fig. 1, these comprise loops or hooks hooked over the cable 34 and provided with loops or rings 38 and 39 at their inner ends through which the ends 31a of the cable 31 at the rear side of the tire extend after they pass through the sleeve 32 to the front of the wheel. After being brought to the front of the wheel these are passed through loop 38, separated and passed through loops 39 and drawn taut and secured at their free end in a clamp 40 on one of the straps 37, indicated at 37a. Any suitable clamp may be used, such for example as opposed plates provided with grooves to receive the free ends of this wire or cable and clamped by the wing nut 41. To maintain the cables and the device taut and snugly fitting on the tire, any one or more of the elements 36, 37 may include springs 42 which are tensioned when the cable is drawn taut and fastened in clamp 40.

In applying the device to the tire, the connected L-shaped members are placed on the tread of the tire as indicated, with the loops 22 on the inner or rear side and with the wire or cable 31 in these loops. The free ends of this wire or cable are threaded through the sleeve 32 in the disc of the wheel to the front and are drawn taut, and they may be clamped and held by a suitable chuck mounted in this sleeve. This chuck in the form shown comprises a clamping ring 42 seating on a tapered wall 43 in the sleeve and a clamping nut 44 threaded into the outer portion of this sleeve and provided with an opening 45 for the free end portions of the wire or cable. After they are drawn tight, by merely tightening up the nut 44 the split ring 42 is clamped against the wire or cable by the tapered walls 43 so that they are securely held, and the tension maintained. Then the free ends are threaded through the loop 38 and the loops 39 and drawn taut and secured in the clamp 40. This operation is easily and quickly performed without difficulty so that the antiskid device may be easily and quickly applied to the tire. It is as easily and quickly removed by merely reversing these operations.

It will be understood the angle at which the legs of the antiskid members 13 are arranged with respect to the sides of the tire may vary as well as the angle between the legs of the individual members. That is, the members may be so located that the long leg 14 extends substantially straight across the tread or at substantially right angles to the sides of the tire, or they may be at any inclined angle. If the long leg is to extend more nearly straight across the tread then the angle between this leg and the shorter leg 15 will be reduced accordingly. This would reduce the amount of tire surface exposed between the legs and would tend to reduce bumping or vibration if that occurred with the more inclined legs.

It will be understood from the above that the device is a very simple and effective one providing continuous and silent antiskid tread to the tire, and one that is noiseless, particularly if the calk elements are omitted, as would ordinarily be the case where it is not intended to be used on ice or a similar surface. The rectangular cross elements provide sufficient traction for usual conditions, such as snow or the like, and the elements are arranged to provide continuous antiskid tread on the surface of the tire and one which would not cause vibration or bumping action as is common with numbers of other antiskid devices. Also, due to their shape and structure, there is no danger of these cross members cutting or injuring the tire in any way. Although substantially flat rubber bars are preferred for the cross members, they may be made of other materials, such as flexible chains, for example, or metal bars. Also the flexible side means for connecting the ends of the separate members at the opposite sides of the tire could be chains if preferred. As the preferred connection between the adjacent members is a hook on one member cooperating with a slot or opening on the next adjacent member, they are easily separated or detached in case of breakage so that a new member may be easily and quickly substituted for a worn or broken member.

Having thus set forth the nature of my invention, I claim:

1. An anti-skid device for tires comprising a series of substantially L-shaped members having one leg longer than the other, means connecting the free end of the shorter leg with the intermediate portion of the longer leg of the adjacent member, and flexible means connecting the opposite ends of the longer legs at the opposite sides of the tire.

2. An anti-skid device for tires comprising a series of substantially L-shaped members having one leg longer than the other, said members comprising substantially flat live rubber bars, attaching means securing the free ends of the shorter legs to an intermediate point of the longer leg of the next adjacent member, and means on the opposite ends of the longer legs for cooperation with flexible connecting means at opposite sides of the tire.

3. An anti-skid device for tires comprising a series of connected members each comprising angularly arranged legs one of which is longer than the other, the longer leg being arranged to extend diagonally across the tire tread, means connecting the free end of the shorter leg of each member to the longer leg of the next adjacent member and at substantially the center of the tire tread, and flexible means connecting together the opposite ends of the longer legs of the members at the opposite sides of the tire.

4. An anti-skid device for tires comprising a series of connected members each comprising a pair of flexible leg portions connected together at one end at an angle to each other and one longer than the other, said members being arranged so that the longer leg extends diagonally across the tread of the tire, means connecting the free end of the shorter leg of each member to the longer leg of the next adjacent member at substantially the center of the tire tread, and flexible means connecting the opposite ends of the longer legs on opposite sides of the tire.

5. An anti-skid device for tires comprising a series of connected members each comprising a pair of flexible substantially flat rubber leg portions connected together at one end to extend at an angle to each other, one of said leg portions of each member being longer than the other and arranged to extend diagonally across the tire tread, means connecting the free end of the shorter leg of each member to the longer leg of the next adjacent member at about the mid-width of the tire tread, and flexible means connecting the opposite ends of the longer legs on the opposite sides of the tire.

6. An anti-skid device for tires comprising a series of connected members each comprising a pair of substantially flat flexible rubber leg portions connected together at one end to extend at an angle to each other, one of said leg portions being longer than the other and arranged to extend diagonally across the tire tread, means connecting the free end of the shorter leg of each member to the longer leg of the next adjacent member at about the mid-width of the tire tread comprising plates anchored in the mid-length of the longer leg and the free end of the shorter leg, one of said plates being provided with an opening and the other plate with a hook to engage in said opening, and flexible means for connecting the opposite ends of the longer legs on opposite sides of the tire.

7. An anti-skid device for tires comprising a series of connected members each comprising a pair of substantially flat flexible rubber leg portions connected together at one end to extend at an angle to each other, one of said leg portions being longer than the other and arranged to extend diagonally across the tire tread, means connecting the free end of the shorter leg of each member to the longer leg of the next adjacent member at about the mid-width of the tire tread, securing means for the opposite ends of the longer legs comprising plates anchored in the free end of the longer leg and the portion at the junction between the legs and provided with loops at the opposite sides of the tire, and flexible cable means passing through the loops on opposite sides of the tire to secure the members together and on the tire tread.

8. An anti-skid device for tires comprising a series of connected members each comprising a pair of substantially flat flexible rubber leg portions connected together at one end to extend at an angle to each other, one of said leg portions being longer than the other and arranged to extend diagonally across the tire tread, means connecting the free end of the shorter leg of each member to the longer leg of the next adjacent member at about the mid-width of the tire tread, members anchored in said leg portions, each provided with a tapped opening, removable calks including a shank threaded into said openings, securing loops fastened to the opposite ends of the longer leg portions, and flexible means in said loops and extending between them on opposite sides of the tire to secure the members together and on the tire.

9. An anti-skid device for tires comprising a series of members each being arranged to extend transversely across the tire tread, connecting means including loops on the opposite ends of the members on opposite sides of the tire, flexible cable means passing through said loops to connect the members on each side of the tire, a series of radially extending straps secured at their outer ends to one of said cable means between adjacent loops and at least one of said straps including a resilient member tending to shorten the strap, and a flexible cable means connecting the inner ends of the straps.

10. An anti-skid device for tires comprising a series of members each being arranged to extend transversely across the tread of the tire, securing means including loops connected to the opposite ends of each member, a flexible cable means extending through and connecting the loops on the outer side of the tire, radially extending straps secured at their outer ends to said cable means intermediate said loops and provided with loops at their inner ends, a flexible cable passing through and connecting the loops on the opposite ends of the members on the inner side of the tire and including end portions adapted to be threaded through an opening in the wheel on which the tire is mounted to the front of the tire and passed in opposite directions through the loops on the inner ends of the straps, and means for securing the free ends of said second cable means together.

IRVING ANDREWS.

REFERENCES CITED

The following references are of record in the file of this patent:

UNITED STATES PATENTS

| Number | Name | Date |
| --- | --- | --- |
| 1,608,280 | Harford | Nov. 23, 1926 |

FOREIGN PATENTS

| Number | Country | Date |
| --- | --- | --- |
| 395,582 | Great Britain | July 20, 1933 |